Patented Apr. 25, 1944

2,347,597

UNITED STATES PATENT OFFICE 2,347,597

DIAMOND ABRASIVE STICK

Adolph Ehrlich, New York, N. Y.

Application August 26, 1943, Serial No. 500,166
No Drawing. Application August 26, 1943,
Serial No. 500,166

7 Claims. (Cl. 51—300)

The present invention relates to abrasive compositions adapted to be applied to tools and wheels for grinding and polishing diamonds and extremely hard metals, and for putting sharp cutting edges on the latter.

More particularly it is an object of this invention to provide such an abrasive in easily applicable and convenient form.

Before this invention, the diamond dust was mixed with either olive oil, castor oil, or machine oil in the form of the liquid mixture of diamond dust and oil. This abrasive liquid mixture had the disadvantage of being easily lost by being thrown off from the rotating wheel or plate by centrifugal force. In this invention, the diamond dust is adhered and sticks to the rotating plate as the beeswax and the other ingredients hold it, and it is extremely economical in use.

It is an object of my invention to simplify the work involved in carrying the operations of grinding and polishing by providing an abrasive composition in the form of a stick in which is incorporated diamond dust. The stick is relatively hard but has low melting point so that when applied to the proper surface of the appropriate grinding or polishing wheel or tool, some of the material thereof will be transferred to and adhere to said tool or wheel.

In carrying out my invention I employ as the carrier, preferably a mixture of beeswax, rosin and shellac, or their equivalents. These ingredients are put in a suitable vessel and heated until they melt. Diamond dust to the predetermined amount is added thereto and stirred up so that the dust particles will be uniformly distributed therethrough. The liquid composition is then poured into suitable molds and allowed to cool. After cooling, the sticks are removed.

I have used with good results, the following formula:

| | Per cent |
|---|---|
| Diamond dust | 50 |
| Beeswax | 30 |
| Rosin | 5 |
| Shellac | 15 |

The amount of diamond dust to be included is variable, depending upon the degree and extent of grinding and polishing, and may vary from 1% to as much or more than 75% of the entire composition. The amounts or relative proportions of beeswax, rosin and shellac can be varied within reasonable limits beyond those prescribed by the formula.

Having described my invention, what I claim is:

1. An abrasive composition containing diamond dust, beeswax, rosin and shellac.

2. An abrasive composition containing diamond dust, and beeswax, rosin and shellac in relative proportions substantially as follows: beeswax 60%, rosin 10%, shellac 30%, and diamond dust any amount.

3. An abrasive composition containing diamond dust 50%, beeswax 30%, rosin 5%, and shellac 15%.

4. An abrasive composition in the form of a stick containing diamond dust, beeswax, rosin and shellac.

5. The method of preparing an abrasive composition which comprises melting beeswax, rosin and shellac, stirring the same with addition of diamond dust, and allowing the resulting product to cool.

6. The method of preparing an abrasive composition which comprises melting beeswax, rosin and shellac in substantially the relative proportions of 60% beeswax, 10% rosin, and 30% shellac, stirring the same with addition of diamond dust, and allowing the resulting product to cool.

7. The method of preparing an abrasive composition which comprises melting beeswax, rosin and shellac, stirring the same with addition of diamond dust, pouring the molten mass into a mold, and allowing the mass to cool.

ADOLPH EHRLICH.